United States Patent Office 3,120,559
Patented Feb. 4, 1964

3,120,559
PREPARATION OF ESTERS OF AROMATIC DICARBOXYLIC ACIDS
Stanford J. Hetzel, Newtown Square, Pa., assignor to Sun Oil Company, Philadelphia, Pa., a corporation of New Jersey
No Drawing. Filed Mar. 26, 1958, Ser. No. 723,982
12 Claims. (Cl. 260—475)

This invention relates to a process for the preparation of esters of aromatic dicarboxylic acids.

It is known that aromatic dicarboxylic acids, including phthalic acid, isophthalic acid, and terephthalic acid, may be esterified by contacting with an alcohol in the presence of sulfuric acid as a catalyst. Generally large amounts of the alcohol and small catalytic proportions of sulfuric acid are used. Esterification usually proceeds rather slowly. Terephthalic acid is particularly difficult to esterify by such methods. The difficulty of esterifying terephthalic acid is to a large extent due to its low solubility in practically all of the usual solvents. For example, the acid is insoluble in ether, acetone, chloroform, water and acetic acid, and only slightly soluble in hot ethanol or methanol.

It is an object of the present invention to provide a new and more efficient process for the preparation of esters of aromatic dicarboxylic acids. Another object is such a method which results in high yields at low temperatures and at atmospheric pressure. Still another object is to provide a method whereby the esterification reaction is completed in a very short period of time. Other objects and their achievement in accordance with this invention will become apparent hereinafter.

According to the process of this invention, a solution of an aromatic dicarboxylic acid in sulfuric acid is contacted with an alcohol, whereby esterification takes place, and the ester is separated from the solution.

Although the process of this invention is applicable to the esterification of any of the aromatic dicarboxylic acids, it is particularly advantageous in the esterification of terephthalic acid, as pointed out hereinabove. The invention is therefore described herein principally in terms of using terephthalic acid.

In the process of this invention, sulfuric acid is used both as a catalyst for the esterification reaction and as a solvent for the terephthalic acid. It is necessary that concentrated sulfuric acid, i.e., having a concentration of at least about 85%, be used in the reaction, since the solubility of terephthalic acid in dilute sulfuric acid is so low as to render the process inoperable. In 93% sulfuric acid, its solubility is .019 gram/gram at 96° F., and .0259 gram/gram at 150° F. Sulfuric acid having a concentration of at least 93%, including oleum, is preferred.

In a preferred embodiment of the invention, terephthalic acid is dissolved in concentrated sulfuric acid in a weight proportion of one part of terephthalic acid to from about 2 to about 100 or more parts of sulfuric acid, and preferably 10 to about 100 parts of sulfuric acid. Methanol, or other alcohol, in gaseous phase, is bubbled through the sulfuric acid solution. The diester, dimethyl terephthalate, begins to form immediately, and continues to form until a substantial portion of the terephthalic acid has been reacted, whereupon a solvent for the diester which is immiscible with sulfuric acid is admixed with the acid solution and agitated. Suitable solvents include chloroform, carbon tetrachloride, ethylene dichloride, and other halogenated saturates. Chloroform is the preferred solvent, due to the high solubility of the esters therein. When all the diester has been dissolved in the solvent, the mixture is allowed to separate into an acid phase and a solvent phase, the solvent phase is drawn off, and the acid phase is conveniently returned to the reaction. The solvent phase is boiled to drive off the solvent, leaving the solid diester. The acid phase is heated to evaporate water formed during the esterification reaction, and additional sulfuric acid and terephthalic acid are added thereto. This solution is now again ready for the esterification reaction. Instead of evaporating water, sulfur trioxide may be injected to raise the concentration of the sulfuric acid.

The process of this invention is suitable for the preparation of any of the diesters of terephthalic acid which may be prepared by the usual esterification reactions. For example, diethyl, diisopropyl, and di-tert-butyl terephthalate may be prepared from the corresponding monohydric alcohols and terephthalic acid. Some of the more commonly used alcohols include methanol, ethanol, isopropanol, n-propanol, tert-butyl alcohol, allyl alcohol, and octyl alcohol.

The temperatures used in the reaction are not critical, although higher reaction rates may be expected at higher temperatures. The temperature must be below the decomposition temperature of sulfuric acid, i.e., about 340° C., and below the boiling point of the product. Good results are obtained at room temperature, and at atmospheric pressure. Preferably the temperature should not exceed about 300° C. It is preferred to carry out the reaction at atmospheric pressure, since generally no advantage is derived from the use of higher pressures. It may at times be desirable to carry out the reaction under pressure, as when it is desired to maintain a low boiling alcohol in liquid phase. The alcohol may be in either liquid or gaseous phase, although generally a gaseous phase is used in order that temperatures above the boiling point of the alcohol may be used without the necessity for superatmospheric pressures.

When liquid phase alcohol is used, any convenient method of admixing the alcohol with the acid solution may be used. The esterification reaction takes place quite rapidly and is usually complete in less than one-half hour. Approximately a stoichiometric quantity of the alcohol, based on the amount of terephthalic acid present, is preferably used in this process.

When using gaseous phase alcohol, any convenient means for contacting gaseous fluids with liquids may be employed. For example, a conventional bubble-cap plate tower, a sieve plate tower or a packed tower may be used. In a laboratory experiment, a column packed with glass helices gave good results. The acid solution was dropped in at the top, a methanol vapor was injected near the bottom, flowing countercurrently to the acid.

After completion of the esterification reaction, the diester, such as dimethyl terephthalate, formed thereby is separated from the acid solution. A preferred method of separating is to extract the diester with chloroform or another solvent for the diester which is immiscible with sulfuric acid, as hereinbefore described. By this process the acid solution from the esterification process is first heated or subjected to a vacuum to remove at least a portion of the dissolved alcohol and the ester is then extracted with chloroform or other solvent. It is desirable to have at least a small amount, say 5% to 30% of water or alcohol present during the extraction process, since the extraction is facilitated thereby. The mixture is allowed to separate into two phases, a solvent phase and an acid phase, and the phases are separated.

The diester is separated from the solvent by any convenient method, such as by boiling off the solvent, and then washed and dried. The acid phase, after addition of more terephthalic acid, is conveniently recycled to the esterification reaction.

High yields of diesters of terephthalic acid are obtained by the process of this invention at very rapid rates. Yields in excess of 60% are obtained at temperatures as low as 70° C., and even greater yields may be obtained at higher temperatures.

The diesters of terephthalic acid produced by the process of this invention have many useful applications, For example, they are useful in the preparation of polymers used in making synthetic textile fibers, as plasticizers, and in the preparation of many useful synthetic resins. The diesters of the other aromatic dicarboxylic acids have similar uses.

The following example, wherein "parts" refers to parts by weight, illustrates the process of this invention:

Ten parts of terephthalic acid were dissolved in 400 parts of 66° Baumé (93%) sulfuric acid at 65° C. The solution was dropped into the top of a column packed with glass helices. Methanol vapor was introduced near the bottom of the column and flowed upwardly countercurrently to the acid solution. After about 25 minutes, all the acid solution has flowed through the tower, and had been collected at the bottom. About 1000 parts of chloroform were then admixed with the bottoms product, and the mixture was allowed to separate into two phases. The chloroform phase was drawn off, and about 1000 parts of fresh chloroform were admixed with the acid phase. This mixture was also allowed to separate into two phases, and the chloroform phase was drawn off and added to the first chloroform phase. The chloroform was then distilled and the residue was slurried in water, filtered, and dried. About 7.8 parts of dimethyl terephthalate, corresponding to a 67% conversion of the terephthalic acid, were recovered.

Ten parts of a mixture of isophthalic acid and terephthalic acid, containing approximately 40% isophthalic acid and 60% terephthalic acid, is dissolved in 300 parts of 93% sulfuric acid at 65° C. To the solution are added, with agitation, 5.5 parts of ethanol. After 30 minutes, agitation is stopped, and the mixed diester is extracted with chloroform, washed and dried, as described above. There were recovered 9.5 parts of the mixed diester, corresponding to a 71% yield.

The invention claimed is:

1. Process for preparing diesters of aromatic dicarboxylic acids which comprises dissolving an aromatic dicarboxylic acid selected from the group consisting of phthalic acid, isophthalic acid and terephthalic acid in sulfuric acid having a concentration of at least 85% at a temperature up to about 340° C., contacting the resulting solution with a monohydric aliphatic alcohol suitable for the preparation of esters of aromatic dicarboxylic acids, mixing the products of said contacting with a chlorine-substituted lower molecular weight, saturated hydrocarbon solvent for the diester, said solvent being immiscible with sulfuric acid and recovering the diester from the solvent.

2. A process as defined by claim 1 wherein the aromatic dicarboxylic acid is terephthalic acid.

3. A process as defined by claim 1 wherein the monohydric alcohol is methanol.

4. A process as defined by claim 1 wherein the monohydric alcohol is ethanol.

5. A process as defined by claim 1 wherein the monohydric alcohol is isopropanol.

6. A process as defined by claim 1 wherein the monhydric alcohol is n-propanol.

7. A process as defined by claim 1 wherein the monohydric alcohol is allyl alcohol.

8. Process according to claim 1 wherein said solvent is chloroform.

9. Process according to claim 1 wherein said contacting is performed at atmospheric pressure.

10. Process according to claim 1 wherein said alcohol is in gaseous phase.

11. Process according to claim 1 wherein said concentration is at least 93%.

12. Process according to claim 1 wherein the amount of sulfuric acid is in the range from 10 to 100 parts by weight per part of aromatic acid, and the amount of alcohol is approximately a stoichiometric amount.

References Cited in the file of this patent

UNITED STATES PATENTS

| | | |
|---|---|---|
| 2,459,014 | Cavanaugh et al. | Jan. 11, 1949 |
| 2,578,312 | Miller et al. | Dec. 11, 1951 |
| 2,806,052 | Siggel | Sept. 10, 1957 |

OTHER REFERENCES

Newman: J. Am. Chem. Soc., 63, 2431 to 2435 (1941).